Patented Aug. 21, 1945

2,382,976

UNITED STATES PATENT OFFICE 2,382,976

N - HYDROCARBON - SUBSTITUTED ALKANOLAMINE SALTS OF HALO-PHENOLS

Gerald H. Coleman, Midland, Mich., assignor to The Dow Chemical Company, Midland, Mich., a corporation of Michigan No Drawing. Application May 27, 1941, Serial No. 395,442

7 Claims. (Cl. 260—563)

This invention relates to amine salts of phenols, and is particularly concerned with the addition products of halo-phenols with N-hydrocarbon-substituted alkanolamines having the following formula:

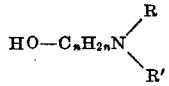

wherein R represents alkyl, cycloalkyl, or aralkyl, R' represents alkyl, cycloalkyl, aralkyl, hydroxyalkyl, or hydrogen, and $n$ is an integer greater than 1, and to parasiticidal compositions comprising such amine salts as active toxicants. I have prepared representative members of the above-identified group of compounds and found them for the most part to be crystalline solids or viscous liquids somewhat soluble in organic solvents and relatively insoluble in water. These compounds are stable to light and air, not appreciably affected by carbon dioxide, and non-corrosive to skin and tissue of higher animals. A preferred group of amine salts which are particularly valuable for use in fungicidal compositions are obtained from the N-hydrocarbon-substituted mono-ethanolamines and diethanolamines with the polychlorophenols.

The new compounds are prepared by reacting a suitable amine compound such as N-butyl-diethanolamine, N-ethyl-monoethanolamine, N-cyclohexyl-diethanolamine, N,N-dibenzyl-monoethanolamine, etc. with a halo-phenol. Substantially equimolecular proportions of halo-phenol and amine have been found to give the desired salts in good yield, although any suitable amounts may be employed. Where an excess of one or the other reactant is present in the final product, separation is readily accomplished by extraction of such product with benzene or other selective solvent for the halo-phenols and amine in which the amine salt is more difficultly soluble. In most instances, however, the crude reaction product consisting essentially of the amine salt along with a small amount of the amine or the phenol is adapted to be employed as a parasiticidal toxicant without further purification.

A preferred method of operation comprises carrying out the reaction in the presence of an organic solvent, such as benzene, chlorobenzene, or alcohol. The operating temperatures are not critical, although reduced amounts of solvent are required when the reaction is carried out at somewhat elevated temperatures, e. g., between about 40° and 120° C., and conveniently at the refluxing temperature of the reaction mixture when a solvent is employed. While the reactants may simply be mixed together, it is generally convenient to add one reactant to a solution of the other in the selected solvent. To insure the formation of a relatively homogeneous product and to minimize occlusion, the reactants are preferably mixed portionwise with stirring over a short period of time. Following completion of the reaction, the mixture is filtered or otherwise manipulated to separate out the desired amine salt compound. Where the desired product is a solid, such separation may comprise recrystallization or washing with solvents to remove unreacted residues of amine or phenol. When the product is liquid, the reaction mixture may be warmed to drive off the solvent of reaction and the residue employed without further treatment. If desired, however, such liquid products may be dispersed in an organic solvent to extract out small portions of unreacted amine or phenol remaining therein.

The following examples set forth certain embodiments of the invention, but are not to be construed as limiting the same:

Example 1

26.65 grams (0.1 mol) of pentachlorophenol was dissolved in 60 milliliters of 95 per cent ethyl alcohol and 13.3 grams (0.1 mol) of N-ethyl-diethanolamine added portionwise thereto with stirring at a temperature of approximately 60° C. over a period of approximately one-half hour. The mixture was stirred for an additional half hour and then cooled to approximately 0° C., filtered, and the residue from the filtration washed with cold ethyl alcohol. This washed residue was air-dried at room temperature to obtain 30 grams of the N-ethyl-diethanolamine salt of pentachlorophenol as white crystals melting at 123°–124.4° C. This compound was relatively soluble in 95 per cent alcohol and slightly soluble in carbon tetrachloride and petroleum distillates. A saturated water solution at 29° C. contained 0.77 gram of the compound per 100 grams solution and had a pH of 7.2.

Example 2

12.85 grams (0.1 mol) of 4-chlorophenol and 13.3 grams (0.1 mol) of N-cyclohexyl-monoethanolamine were mixed together with the evolution of appreciable heat of reaction. The mixture was heated on a steam bath with stirring for approximately one-half hour and thereafter cooled to obtain an N-cyclohexyl-monoethanolamine salt of 4-chlorophenol product as a thick viscous oil, golden-yellow in color, and having a specific gravity of 1.13 at 25°/25° C. This product was soluble in 95 per cent ethyl alcohol and carbon tetrachloride and very slightly soluble in petroleum distillate. A saturated water solution at 29° C. contained 1.7 grams of the product per 100 grams solution and had a pH of 9.6.

Example 3

13.3 grams (0.1 mol) of N-cyclohexyl-monoethanolamine and 16.3 grams (0.1 mol) of 2,4-dichlorophenol were dissolved in benzene with the evolution of considerable heat of reaction. The mixture was heated on a steam bath to evaporate off the benzene and obtain an N-cyclohexylmonoethanolamine salt of 2,4-dichlorophenol product as a red oil having a specific gravity of 1.22 at 25°/25° C. This product was soluble in 95 per cent ethyl alcohol, carbon tetrachloride and petroleum distillate. A concentrated water solution contained 0.22 gram of the product per 100 grams solution and had a pH of 8.1.

Example 4

11.7 grams (0.1 mol) of N-butyl-monoethanolamine was added portionwise with stirring to 17.3 grams (0.1 mol) of 2-bromo-phenol. Considerable heat of reaction was liberated. The mixture was heated and stirred on a steam bath for approximately one-half hour and thereafter cooled to obtain an N-butyl-monoethanolamine salt of 2-bromophenol product as a thick viscous, golden-yellow oil having a specific gravity of 1.29 at 25°/25° C. This product was soluble in 95 per cent ethyl alcohol and carbon tetrachloride, and slightly soluble in petroleum distillate. A saturated water solution at 29° C. contained 1.4 grams of the product per 100 grams solution and had a pH of 9.1.

Example 5

25.5 grams (0.1 mol) of 2-bromo-4-cyclohexyl-phenol was dissolved in 70 milliliters of 95 per cent ethyl alcohol and 8.9 grams (0.1 mol) of N-ethyl-monoethanolamine added portionwise thereto with stirring. The reaction mixture was heated on a steam bath for a short time and thereafter cooled to 0° C. and filtered. The residue from the filtration was washed with cold ethyl alcohol and dried to obtain 24 grams of the N-ethyl-monoethanolamine salt of 2-bromo-4-cyclohexyl-phenol as a white crystalline compound melting at 103°–103.6° C. This compound was soluble in ethyl alcohol, carbon tetrachloride, and petroleum distillate. A saturated water solution at 29° C. contained 0.003 gram of the compound per 100 grams solution and had a pH of 9.5.

Example 6

17.3 grams (0.1 mol) of N,N-di-(n-butyl)-monoethanolamine and 18.45 grams (0.1 mol) of 2-chloro-4-tertiarybutyl-phenol were mixed together with the evolution of appreciable heat of reaction. The mixture was then warmed on the steam bath for one hour and thereafter cooled to obtain an N,N-di-(n-butyl)-monoethanolamine salt of 2-chloro-4-tertiarybutyl-phenol product as a straw-colored oil having a specific gravity of 0.998 at 25°/25° C. This product was soluble in 95 per cent ethyl alcohol, carbon tetrachloride, and petroleum distillate. A saturated water solution contained 0.017 gram of the product per 100 grams solution and had a pH of 9.8.

Example 7

17.3 grams (0.1 mol) of N,N-di-(n-butyl)-monoethanolamine and 20.45 grams (0.1 mol) of an isomeric mixture of 2-phenyl-monochlorophenols (ortho-para mixture having a specific gravity of 1.237 at 25°/25° C.) were mixed together. Considerable heat of reaction was liberated. The mixture was heated on a steam bath for one hour and thereafter cooled to obtain an N,N-di-(n-butyl)-monoethanolamine salt of 2-phenyl-monochlorophenol product as a yellow liquid having a specific gravity of 1.058 at 25°/25° C. and soluble in ethyl alcohol, carbon tetrachloride and petroleum distillate. A saturated water solution at 26° C. contained 0.016 gram of the product per 100 grams solution and had a pH of 9.9.

Other N-hydrocarbon-substituted alkanolamines may be employed as shown in the examples to obtain addition salts of the halophenols. Representative of such amine compounds are N,N-diethyl-monoethanolamine, N-butyl-ethanolamine, N,N-dicyclohexyl-monoethanolamine, N-benzyl-monoethanolamine, N,N-dibenzyl-monoethanolamine, N-(beta-phenylethyl)-diethanolamine, N-octyl-diethanolamine, N-methyl-monoisobutanolamine, N-isobutyl-diethanolamine, N-butyl-dipropanolamine, N-cyclohexyl-monopentanolamine, N-ethyl-di-(n-hexanol)-amine, etc. In place of the halophenols shown in the examples, other representative compounds such as 2,4,6-tribromo-phenol, 2-bromo-3,4,6-trichlorophenol, 2,5-dichlorophenol, 2,4-dichloro-6-phenylphenol, 2,6-dichloro-4-cyclohexyl-phenol, 2,6-dibromo-4-benzyl-phenol, 2,4,5-trichloro-6-methylphenol, monochloro-carvacrol, monobromo-thymol, and the like may be employed.

The N-hydrocarbon-substituted alkanolamine addition salts of halo-phenols as set forth in the preceding examples may be used as active toxicants in parasiticidal compositions. While all of these compounds exert a definite bactericidal action, some have been found particularly well adapted for use in insecticidal and fungicidal spray or dust compositions for the control of plant parasites.

When employed in dust mixtures, the salts are preferably dispersed in and on solid finely-divided inert carriers, such as diatomaceous earth, volcanic ash, bentonite, talc, finely-divided wood flour, and the like. For dusting purposes compositions comprising from about 0.5 to 5 per cent by weight of the amine salt are particularly useful.

Dispersions of the amine salts on or in inert carriers may also be suspended in water and employed as agricultural sprays. In preparing dust mixtures for use in such aqueous compositions, the amine salts may be employed in amounts up to 50 or 60 per cent by weight of the finely-divided solid concentrate, although from 15 to 25 per cent by weight is preferred. Similarly aqueous solutions or dispersions of the amine salts or solutions thereof in such solvents as alcohol, carbon tetrachloride, and petroleum distillate are useful in parasiticide and bactericidal control.

Various wetting, sticking, and dispersing agents, such as glyceryl oleate, alkali metal caseinates, aluminum naphthenate, alkali metal salts of sulfonated aromatic hydrocarbons and phenols, sodium lauryl sulfate, partially-neutralized sulfuric acid derivatives of fatty acids and their esters, blood albumen, soap, and the like may be employed in combination with the new amine salts. Similarly the amine salts can be combined with other insecticidal and fungicidal agents, such as petroleum, fish and vegetable oils, lead arsenate, sulfur, copper sprays, etc. for the control of various insect and fungous pests.

The following compositions are representative of mixtures found suitable for parasiticidal control:

*Composition A*

| Material | Parts by weight |
| --- | --- |
| N-cyclohexyl-monoethanolamine salt of 2.4-dichlorophenol | 16.6 |
| Diatomaceous earth | 66.8 |
| Sodium lauryl sulfate | 16.6 |

The foregoing materials were ground together to form an insecticidal concentrate which was found effective in water dispersion, at from 0.25 to 3.0 pounds of the amine salt per 100 gallons, for the control of such insects as red spider, poplar aphis, and tent caterpillar.

*Composition B*

| Material | Parts by weight |
| --- | --- |
| N-cyclohexyl-monoethanolamine salt of 2.4-dichlorophenol | 12 |
| Diatomaceous earth | 48 |
| Partially-neutralized sulfonated sperm oil | 30 |
| Light lubricating oil | 270 |

The amine salt and diatomaceous earth were ground together and the resulting dust product dispersed in a mixture of the oils to obtain a water-dispersible ovicidal concentrate. When dispersed in water in such amount as to give a concentration of from 1 to 3 pounds of the amine salt per 100 gallons, the oily composition was found effective against the eggs of representative insect pests.

*Composition C*

| Material | Parts by weight |
| --- | --- |
| N.N-di-(normal-butyl)-monoethanolamine salt of 2-chloro-4-tertiarybutyl-phenol | 16.6 |
| Diatomaceous earth | 66.8 |
| Sodium lauryl sulfate | 16.6 |

The foregoing materials in the amounts indicated were ground together to obtain a dust concentrate adapted to be employed in water dispersion as a stomach and contact poison for the control of such insects as tent caterpillar, Colorado potato beetle, fall web worm, poplar aphis, oak leaf roller, and the like.

The amine salt compounds as set forth in the foregoing examples and description may be properly identified by the following structural formula

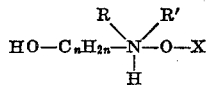

wherein R represents an alkyl, cycloalkyl, or aralkyl radical, R' represents hydrogen or an alkyl, cycloalkyl, aralkyl, or hydroxy-alkyl radical, $n$ is an integer greater than 1, and —O—X represents an aromatic-oxy radical of the benzene series characterized by having the oxygen directly attached to the benzene nucleus and by at least one halogen group substituted in the oxygenated-benzene nucleus. Similarly, preferred embodiments of the invention consisting of subgeneric groups of salts obtained by reacting N-hydrocarbon-substituted alkanolamines with particular halophenols may be characterized by substituting for "—O—X" in the foregoing formula such structural designations as,

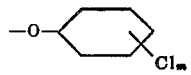

wherein $m$ is an integer from 2 to 5, inclusive.

I claim:

1. An N-hydrocarbon-substituted alkanolamine salt of a halo-phenol having the formula

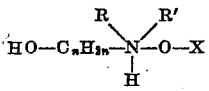

wherein R represents a member of the group consisting of alkyl, cycloalkyl, and aralkyl radicals, R' represents a member of the group consisting of hydrogen and alkyl, cycloalkyl, aralkyl, and HO—C$_n$H$_{2n}$ radicals, $n$ is an integer from 2 to 6, inclusive, and —O—X represents an aromatic-oxy radical of the benzene series characterized by having the oxygen directly attached to the benzene nucleus and by at least one halogen group substituted in the oxygenated-benzene nucleus.

2. An N-hydrocarbon-substituted mono-alkanolamine salt of a halo-phenol having the formula

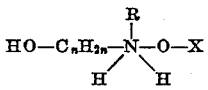

wherein R represents a member of the group consisting of alkyl, cycloalkyl, and aralkyl radicals, $n$ is an integer from 2 to 6, inclusive, and —O—X represents an aromatic-oxy radical of the benzene series characterized by having the oxygen directly attached to the benzene nucleus and by at least one halogen group substituted in the oxygenated-benzene nucleus.

3. An N-hydrocarbon-substituted di-alkanolamine salt of a halo-phenol having the formula

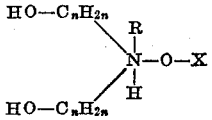

wherein R represents a member of the group consisting of alkyl, cycloalkyl, and aralkyl radicals, $n$ is an integer from 2 to 6 inclusive, and —O—X represents an aromatic-oxy radical of the benzene series characterized by having the oxygen directly attached to the benzene nucleus and by at least one halogen group substituted in the oxygenated-benzene nucleus.

4. An N-hydrocarbon-substituted alkanolamine salt of a polychlorophenol having the formula

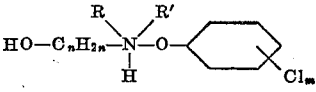

wherein R represents a member of the group consisting of alkyl, cycloalkyl, and aralkyl radicals, R' represents a member of the group consisting of hydrogen and alkyl, cycloalkyl, aralkyl, and HO—$S_nH_{2n}$ radicals, $n$ is an integer from 2 to 6, inclusive, and $m$ is an integer from 2 to 5, inclusive.

5. The N-ethyl-diethanolamine salt of pentachlorophenol, a white crystalline compound melting at 123°–124.4° C.

6. The N-cyclohexyl-monoethanolamine salt of 2.4-dichlorophenol, a red oil having a specific gravity of 1.22 at 25°/25° C.

7. The N.N-di-(n-butyl)-mono-ethanolamine salt of 2-chloro-4-tertiarybutyl-phenol, a straw colored oil having a specific gravity of 0.998 at 25°/25° C.

GERALD H. COLEMAN.

CERTIFICATE OF CORRECTION.

Patent No. 2,382,976. August 21, 1945.

GERALD H. COLEMAN.

It is hereby certified that error appears in the printed specification of the above numbered patent requiring correction as follows: Page 4, first column, line 1, claim 4, for "HO-$S_nH_{2n}$" read --HO-$C_nH_{2n}$--; and that the said Letters Patent should be read with this correction therein that the same may conform to the record of the case in the Patent Office.

Signed and sealed this 25th day of December, A. D. 1945.

Leslie Frazer (Seal)   First Assistant Commissioner of Patents.